United States Patent
Krone et al.

(10) Patent No.: US 11,662,245 B2
(45) Date of Patent: May 30, 2023

(54) PAYLOAD MEASUREMENT SYSTEM FOR MACHINE WITH HAULING BODY

(71) Applicant: Caterpillar Inc., Peoria, IL (US)

(72) Inventors: John J. Krone, Peoria, IL (US); Mitchell C. Vlaminck, Germantown Hills, IL (US); James C. Hall, Peoria, IL (US); Daniel P. Sergison, East Peoria, IL (US); Mark A. Spatz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 59 days.

(21) Appl. No.: 16/844,756

(22) Filed: Apr. 9, 2020

(65) Prior Publication Data
US 2021/0318160 A1    Oct. 14, 2021

(51) Int. Cl.
| | | |
|---|---|---|
| G01G 3/14 | (2006.01) | |
| E02F 9/22 | (2006.01) | |
| G01G 19/12 | (2006.01) | |

(52) U.S. Cl.
CPC ......... *G01G 3/1406* (2013.01); *E02F 9/2221* (2013.01); *G01G 3/1408* (2013.01); *G01G 19/12* (2013.01)

(58) Field of Classification Search
CPC ........ G01G 19/042; G01G 19/12; G01G 3/12; G01G 3/1406; G01G 3/1408; E02F 9/2221
See application file for complete search history.

(56) References Cited

U.S. PATENT DOCUMENTS

| | | | | |
|---|---|---|---|---|
| 4,576,053 A | * | 3/1986 | Hatamura | E02F 9/26 338/5 |
| 5,327,791 A | * | 7/1994 | Walker | G01G 19/12 177/211 |
| 5,811,738 A | | 9/1998 | Boyovich | |
| 6,122,979 A | * | 9/2000 | Tsuchie | G01G 19/12 73/862.622 |
| 6,173,615 B1 | * | 1/2001 | Takahashi | G01L 5/0004 73/794 |
| 10,690,557 B2 | * | 6/2020 | Pence | G01L 1/16 |
| 2004/0104596 A1 | | 6/2004 | Bender | |
| 2007/0062738 A1 | * | 3/2007 | Reichow | G01G 19/08 177/137 |
| 2008/0262774 A1 | * | 10/2008 | Fasig | G01G 23/48 702/101 |
| 2009/0266620 A1 | | 10/2009 | Kallonen | |

(Continued)

FOREIGN PATENT DOCUMENTS

| | | | |
|---|---|---|---|
| JP | H1137831 A | * | 2/1999 |
| WO | 2015000665 | | 1/2015 |

*Primary Examiner* — Natalie Huls
(74) *Attorney, Agent, or Firm* — Leydig, Voit & Mayer, Ltd.

(57) ABSTRACT

A payload measurement system can be used to measure the payload added to a machine supported on a plurality of walking beams. A plurality of load cell sensors is mounted to the walking beams in locations where, when the walking beam bends, the sensors are placed under load. The load cell sensors include a symmetrical strain bar having first and second mounting ends connected by a connecting span, wherein the end thickness is greater than the span thickness of the connecting span. The connecting span is disposed between and spaced apart from an upper plane and a lower plane with which the surfaces of the mounting ends are aligned.

17 Claims, 9 Drawing Sheets

(56) References Cited

U.S. PATENT DOCUMENTS

| | | | |
|---|---|---|---|
| 2012/0205182 A1* | 8/2012 | Rindfleisch | B60K 23/0808 |
| | | | 180/338 |
| 2016/0103011 A1* | 4/2016 | Lustenberger | F16L 3/18 |
| | | | 73/862.637 |
| 2017/0016757 A1* | 1/2017 | Strong | B60G 17/017 |
| 2017/0050643 A1* | 2/2017 | Lambert | B60P 1/045 |
| 2020/0281112 A1* | 9/2020 | Salowitz | A01C 7/208 |

* cited by examiner

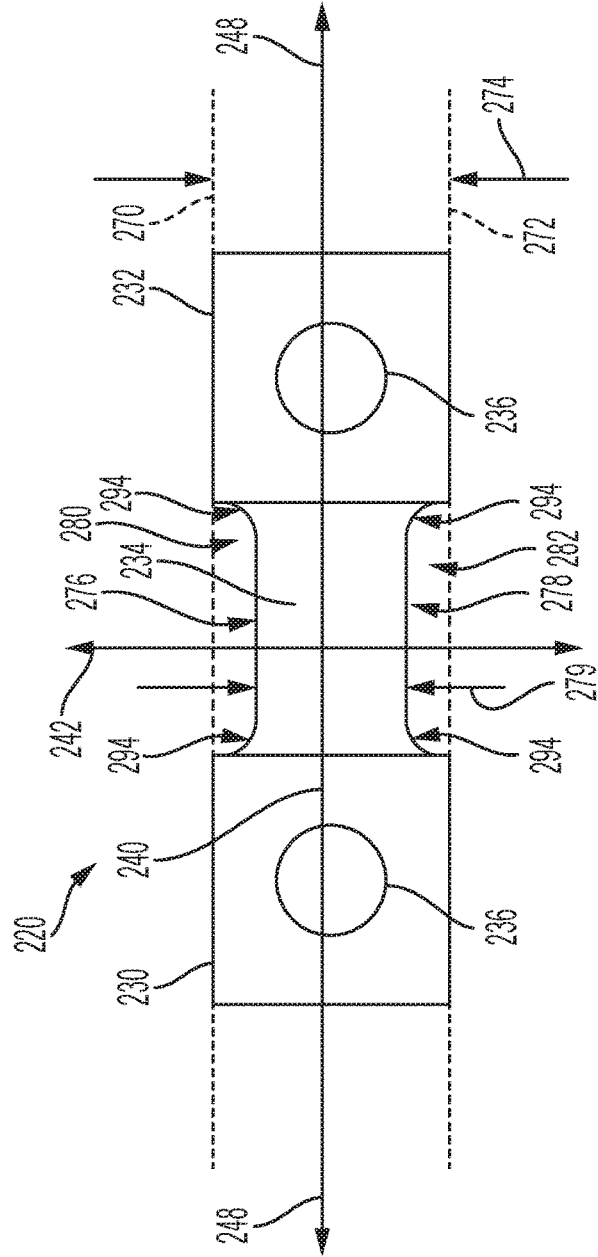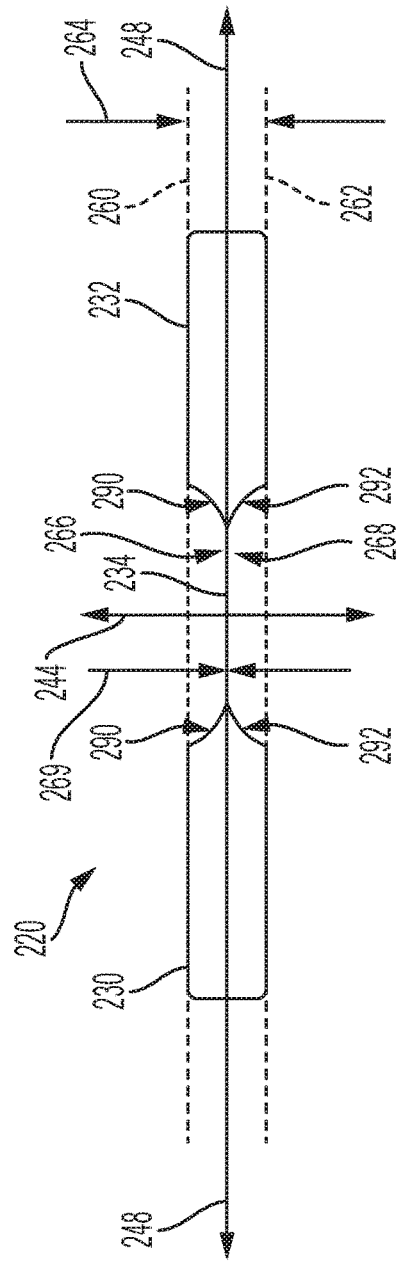

PAYLOAD MEASUREMENT SYSTEM FOR MACHINE WITH HAULING BODY

TECHNICAL FIELD

This patent disclosure relates generally to a payload measurement system for measuring the payload being carried by a machine with a hauling body and, more particularly, to a payload measurement system utilizing a plurality of load cell sensors.

BACKGROUND

Mobile machines like articulated trucks and dump trucks may be equipped with hauling bodies or dump bodies that can accommodate bulk materials like earth, ores, or aggregates that are typically used in industries such as mining and construction to transport material to, from, or about a worksite. The hauling body is often an open topped, box-like structure supported on the frame of the machine into which material can be loaded. It is sometimes desirable to know the weight of the material accommodated in the hauling body for various reasons. For example, if the machine is under filled, its operating efficiency is negatively affected, while if it is overfilled, the added weight may overly burden the components and associated systems of the machine and may violate weight restriction regulations. In addition, machine owners and operators are often compensated by the weight or volume of material payload that is transported by the machine. The weight of the payload may also be useful for assessing the balance of the machine, power requirements for the machine, cyclic load stresses imparted to the machine, and other applications.

Accordingly, payload measurement systems may be included with the machine to measure the material payload accommodated in the hauling body. One example of a payload measurement system is disclosed in U.K. Patent Application 2515795A ("the GB '795 publication"), titled "Payload Measurement System." The GB '795 publication describes a system that uses a plurality of sensors that are attached at various locations on the frame of the machine. As the material is loaded to the hauling body, the sensors can measure the resulting shear forces or loads imparted to the frame. The GB '795 publication also describes an electronic controller communicating with the plurality of sensors to receive data signals and that is configured to estimate the payload weight. The present application is also directed to a payload measurement system utilizing a plurality of sensors having unique and novel configurations.

SUMMARY

The disclosure describes, in one aspect, a payload measurement system for a machine with a hauling body supported on one or more walking beams. The walking beam includes a first beam end connected to a first axle, a second beam end connected to a second axle, and a center joint pivotally connected to a frame of the machine. To measure load in the hauling body, a plurality of load cell sensors is mounted to the walking beam including at least a first load cell sensor located at the first beam end and a second load cell sensor located at the second beam end. The first and second load cell sensors include a symmetrical strain bar having a first mounting end and a second mounting end of a given end thickness. The symmetrical strain bar also includes a connecting span extending between the first and second mounting ends. The end thickness of the first and second mounting ends are greater than the span thickness associated with the connecting span. The payload measurement system may also include an electronic controller in electronic communication with the first load cell sensor and the second load cell sensor and that can be programed to determine a material payload in the hauling body.

In another aspect, the disclosure describes a load cell sensor for a payload measurement system that includes a symmetrical strain bar. The symmetrical strain bar has a first mounting end and a second mounting end that each include an upper end surface aligned in an upper plane and a lower end surface aligned in a lower plane. An end thickness is defined between the upper plane and the lower plane. The symmetrical strain bar also includes a connecting span extending between the first and second mounting ends and equally spaced from the upper plane and the lower plane. The end thickness of the first and second mounting ends can be greater than a span thickness associated with the connecting span. A potting material can encase the symmetrical strain bar in a rectangular housing.

In yet another aspect, the disclosure describes a symmetrical strain bar for a load cell sensor. The symmetrical strain bar includes a first mounting end and a second mounting end spaced apart along a longitudinal axis of the symmetrical strain bar. The first and second mounting ends are flat and aligned in an upper plane and a lower plane. The symmetrical strain bar also includes a connecting span aligned on the longitudinal axis and joined between the first mounting end and the second mounting end such that an external load applied to the longitudinal axis is linearly directed through the connecting span. The connecting span may be evenly spaced between the upper plane and the lower plane.

BRIEF DESCRIPTION OF THE DRAWINGS

FIG. 5 is a top plan view of the symmetrical strain bar with a connecting span of reduced width extending between first and second mounting ends of the strain bar.

FIG. 6 is a side elevational view of the symmetrical strain bar illustrating the connecting span of reduced thickness extending between the first and second mounting ends of the strain bar.

DETAILED DESCRIPTION

Figure 1:
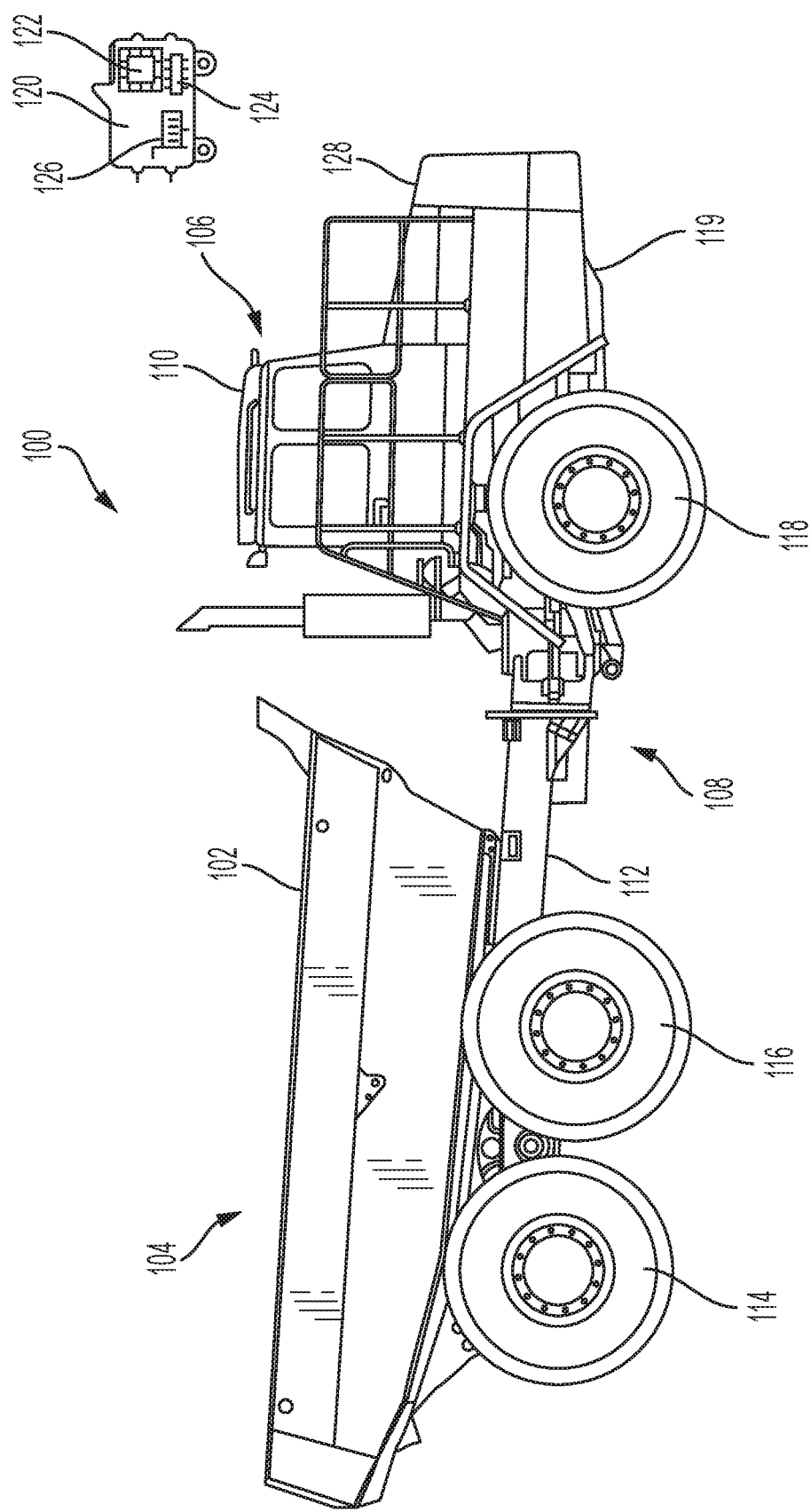
FIG. 1 is a side elevational view of an exemplary machine including a hauling body to accommodate material and that may be configured with a payload measurement system in accordance with the disclosure.

Now referring to the drawings, wherein whenever possible like reference numbers will refer to like elements, there is illustrated an exemplary mobile machine 100 having a hauling body 102 for loading with and transporting bulk materials like ores, earth, and aggregates; however, aspects of the disclosure may be applicable to other types of mobile machines such as loaders, dozers, excavators, pipe layers, and the like. In the illustrated embodiment, the machine 100 may be an articulated truck that includes a rear assembly 104 and a front assembly 106 that may be pivotally connected by an articulation joint 108 so that the rear and front assemblies may pivot relative to one another for improved turning capabilities. The hauling body 102 can be part of the rear assembly 104 and the front assembly 106 can include an operator cab 110 to accommodate a machine operator. The hauling body 102 may be configured as an open topped, box-like structure into which the material may be loaded from a wheel loader, excavator, or other loading machine. The hauling body 102 may be supported on a rear frame 112 or chassis associated with the rear assembly 104 which, in turn, may be operatively supported on a rear wheel set 114 and a forwardly located center wheel set 116, either or both of which may be powered drive wheels for propelling the machine 100. To discharge the loaded material, the hauling body 102 may be configured as a dump body to tilt with respect to the rear frame 112 so that material falls from the rear of the machine 100. The front assembly can include a front frame 119 that supports the operator cab 110 and that is operatively supported on a corresponding front wheel set 118. The mobile machine 100 can turn by causing the front assembly 106 to pivot with respect to the rear assembly 104 at the articulation joint 108.

The operator cab 110 can include the various input devices, output devices, and other controls for operating the machine 100 such as steering controls, gear shifts, and accelerator and brake pedals. As described in more detail below, operation of the machine 100 may be further regulated via an electronic controller 120 (illustrated schematically), which may also be referred to as an electronic control unit or control module.

The electronic controller 120 can be a programmable computer device and can include one or more microprocessors 122 or similar circuitry for processing computer executable instructions, programs, and data, and may further include computer readable and writeable memory 124 or similar data storage capabilities. Although the electronic controller is illustrated as a single device, in possible embodiments its functionality may be performed by a plurality of devices. In an embodiment, the microprocessors 122 and other circuitry can be a preprogrammed, dedicated device like an application specific integrated circuit (ASIC) or field programmable gate array (FPGA). The microprocessor 122 and the memory 124 are capable of storing and executing programs, applications, and software written in computer readable programming code to perform data processing tasks and execute instructions. To send and receive data in the form of electrical signals with other electronic components, the electronic controller 120 can include an input/output interface 126, which may include various ports, drivers, etc.

To power the machine 100, the front assembly 106 can also include a power plant 128 such as an internal combustion engine for burning a combustible fuel and converting the chemical energy stored therein to mechanical work. The power plant 128 can combust any suitable hydrocarbon fuel such as diesel, gasoline, natural gas, dimethyl ether, hydrogen, or combinations thereof.

Figure 2:
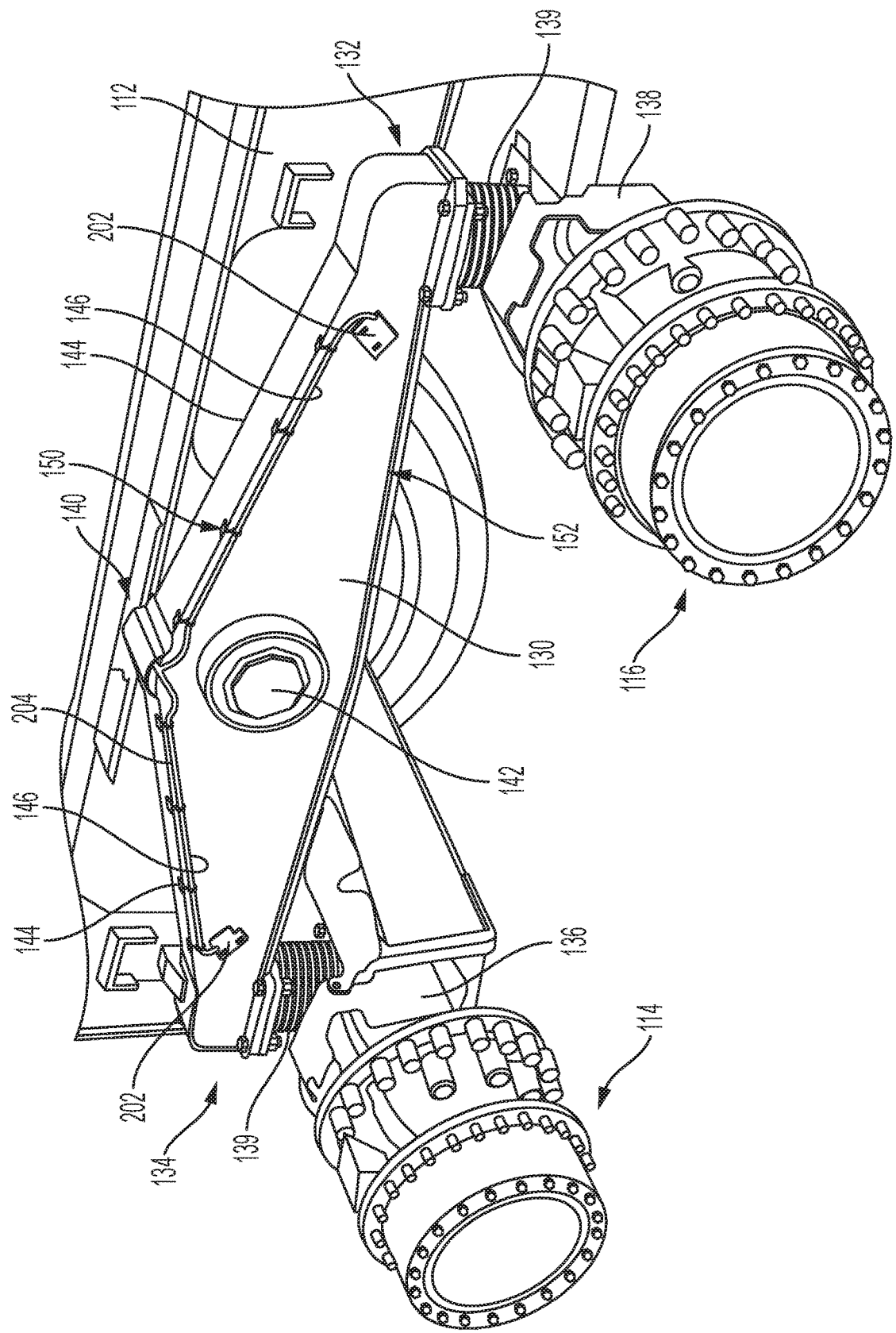
FIG. 2 is a perspective view of a walking beam that can be pivotally connected to a frame of the machine and which may be operatively supported on first and second axles of the machine.

Referring to FIG. 2, the rear wheel set 114 and the center wheel set 116 of the rear assembly 104 can be operatively connected to the rear frame 112 through a linkage system that includes one or more walking beams 130. For clarity, the tires of the front and rear wheel set 114, 116 are not illustrated. In particular, although one walking beam 130 associated with one lateral side of the machine 100 is illustrated, a walking beam may be operatively associated with each lateral side of the machine 100. The walking beam 130 can be an elongated structure that may have a first beam end 132 and a second beam end 134. The walking beam 130 can be arranged perpendicularly to and extend over a rear axle 136 operatively associated with the rear wheel set 114 and a center axle 138 operatively associated with the center wheel set 116. In particular, the first beam end 132 of the walking beam 130 can connect with the center axle 138 and the second beam end 134 can connect with the rear axle 136. The rear axle 136 and the center axle 138 can be journalled with respect to the walking beam 130 so that the rear wheel set 114 and center wheel set 116 can rotate with respect to the rear frame 112. The rear and center axles 136, 138 can be configured at their ends to couple to the rear and center wheel sets 114, 116. To enable the rear and center axles 136, 138 to move relative to the walking beam 130 as the rear wheel set and center wheel set roll over the ground, a flex joint 139 or similar suspension member can be provided between the rear and center axles 136, 138 and the first and second beam ends 132, 134 of the walking beam 130 to which they are connected. The flex joints 139 can be manufactured from layers of elastomers and metal bonded together to have a resilient, flexible characteristic.

To enable the rear axle 136 and center axle 138 to move with respect to each other as the machine 100 travels over uneven terrain, and thus allow the machine to "walk," the walking beam 130 may be pivotally joined between the first beam end 132 and second beam end 134 to the rear frame 112. In the illustrated example, the walking beam 130 can have a generally triangular outline including a center apex 140 between the first and second beam ends 132, 134 and a center joint 142 can be disposed proximate the center apex 140 between the first and second beam ends 132, 134. The walking beam 130 can be placed adjacently alongside the rear frame 112 and joined thereto by the center joint 142 such that the first beam end 132 and second beam end 134 can move vertically upwards and downwards with respect to each other. Additionally, when the walking beams 130 are joined along each lateral side of the machine 100, the opposing ends of the rear axle 136 and the opposing ends of the center axle 138 can move vertically with respect to each other to laterally balance the machine. The walking beam 130 can be made from any suitable material such as a high strength structural steel. To afford the walking beam 130 with sufficient strength, the walking beams can have a dimensional width between an inner lateral face 144 and an opposing outer lateral face 146 to resist significant bending or twist of the beam over its length. In addition, the walking beam 130 can include an upper surface 150 that extends to the center apex 140 over the center joint 142 and a lower surface 152 that extends underneath the center joint 142.

Because the walking beams 130 interconnect the rear and center axles 136, 138 with the rest of the rear assembly 104 disposed above the axles, the weight or forces associated with a material loaded to the hauling body 102 will be transmitted through the walking beams. To measure those forces, the machine 100 can be associated with a payload measurement system 200 that may include a plurality of sensors 202 mounted on the walking beam 130 at specific locations. In an embodiment, the sensors 202 may be load cell sensors or another force transducer that is configured to generate an electrical signal in response to a mechanical force applied to the sensor. The strength of the electrical signal from the load cell sensors 202 can vary in response to the amount of force applied. The payload measured by the payload measurement system 200 can be used to measure the quantity of material hauled by the machine 100 for compensation and to avoid excessive loading, to regulate the operating conditions of the machine 100 such as power requirements, and to gather other information about the use of the machine 100.

Figure 3:
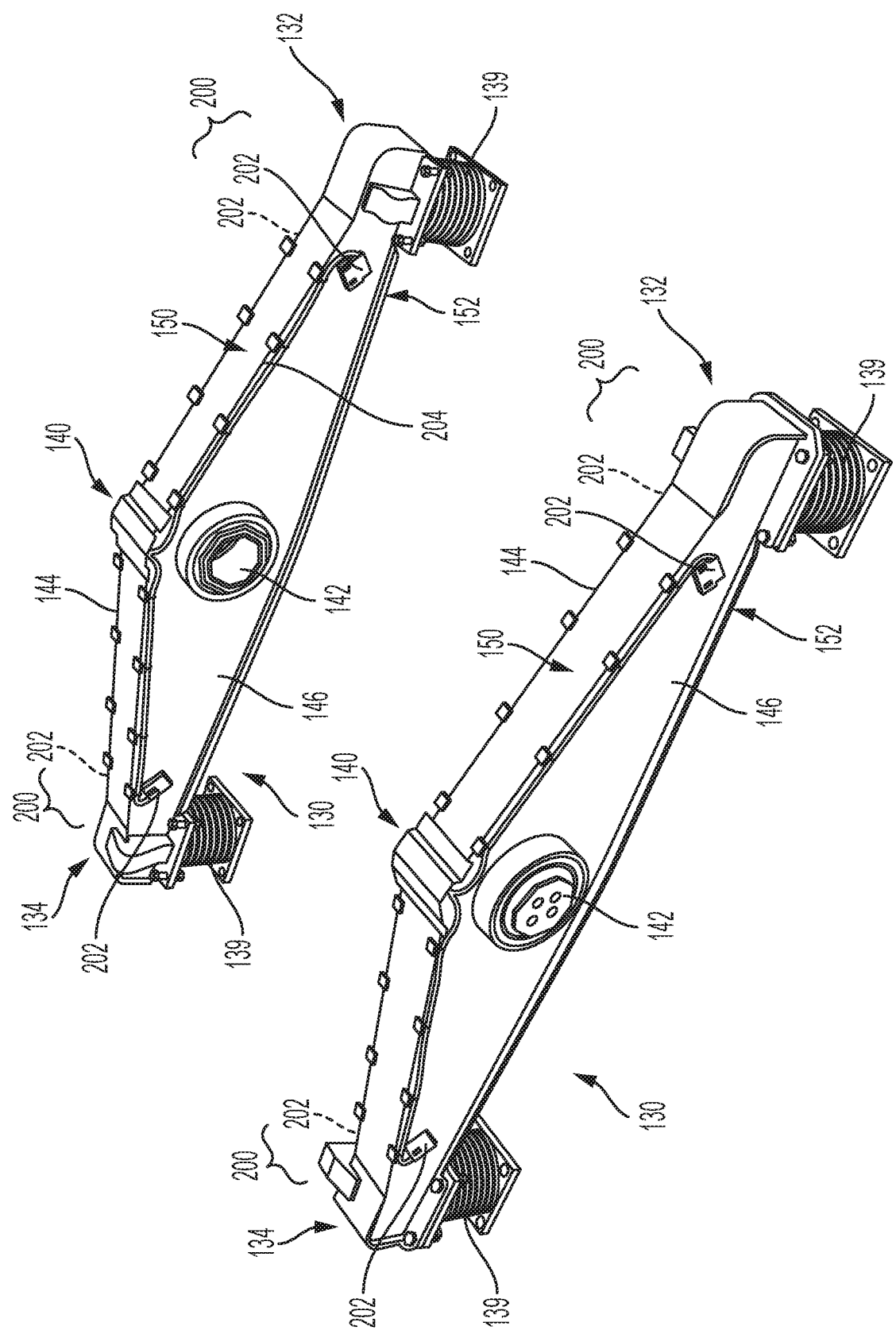
FIG. 3 is a perspective view of a first and second walking beam arranged in parallel and with a plurality of load cell sensors mounted thereto.

Referring to FIG. 3, because the triangular shaped walking beams transfer load forces from the center joint 142 rearward and forward to the first and second beam ends 132, 134 that connect to the axles, a load cell sensor 202 may be mounted proximate to the first beam end 132 and to the second beam end 134 of each walking beam 130 on the machine 100. In particular, the load cell sensor 202 can be mounted on the inner lateral face 144 of the walking beam 130. An additional load cell sensor 202 can be mounted to the outer lateral face 146 of the walking beam 130 proximate the first and second beam ends 132, 134 so that load cell sensors are disposed on each laterally opposing face. Accordingly, as illustrated in FIG. 3, a total of eight load cell sensors 202 are attached to the two walking beams 130 of the machine 100. In other embodiments, the payload measurement system 200 can include other numbers of load cell sensors 202 such as four load cell sensors, one mounted to the first and second beam ends 132, 134, or possibly two sensors with one mounted to the first beam end 132 of one walking beam 130 and another mounted to the second beam end 134 of the other walking beam 130.

To deliver power to the load cell sensors, one or more conductive cables 204 can be disposed over the walking beam 130, for example, extending along the upper surface 150 from the sensors located at the first and second beam ends 132, 134 to the center apex 140. The cables 204 may include wires or conductors that are also able to transmit electrical signals indicative of the forces measured by the load cell sensors. The conductive cables 204 can establish electrical communication between the plurality of load cell sensors 202 and the electronic controller described in FIG. 1.

Figure 4:
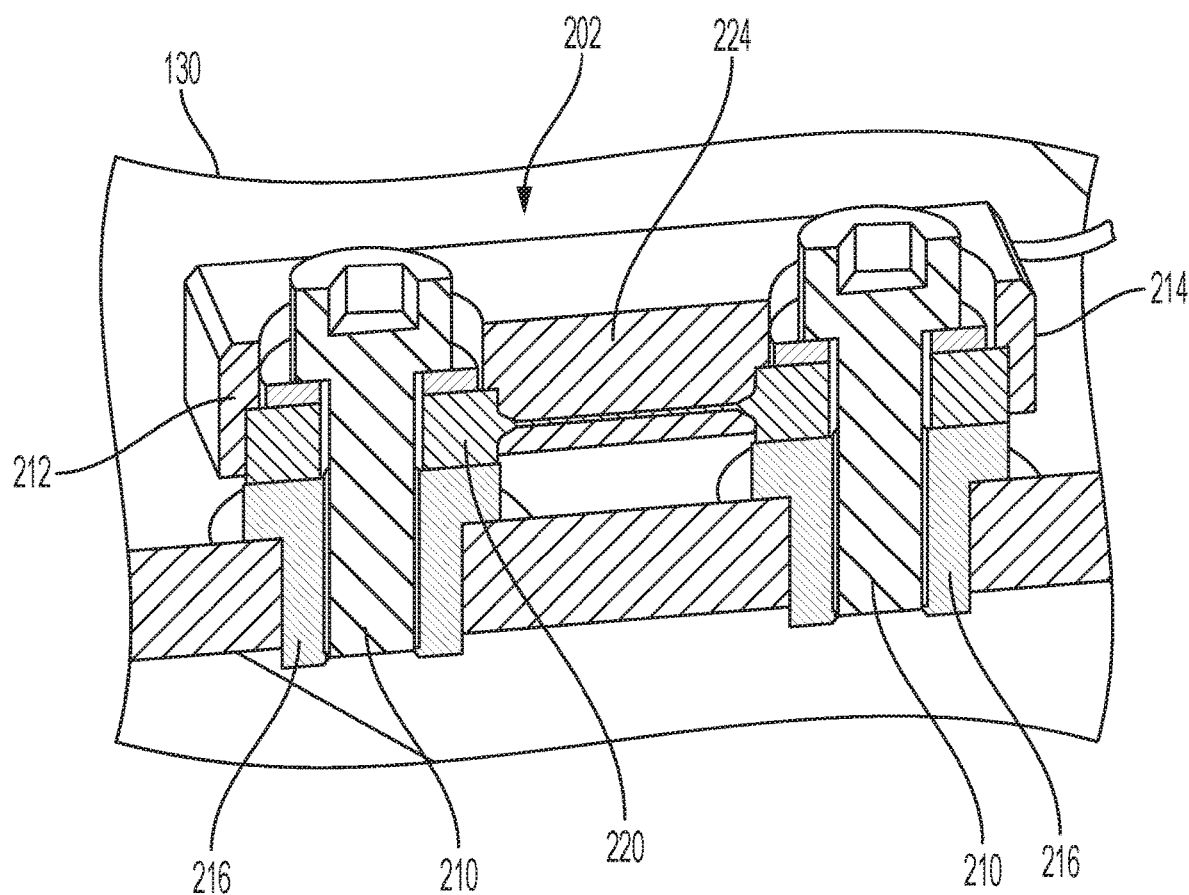
FIG. 4 is a cross-sectional perspective view of a load cell sensor mounted to the walking beam and illustrating a symmetrical strain bar included therein.

Referring FIG. 4, the load cell sensor 202 can be a rectangular structure and can be mounted to the walking beam 130 by a pair of fasteners 210 inserted through a first sensor end 212 and an opposing second sensor end 214. In an embodiment, to engage the fasteners 210, a pair of threaded inserts 216 can be welded to apertures defined through the walking beam 130. The threaded inserts 216 may result in spacing the load cell sensor 202 from the surface of the walking beam 130. In an embodiment, washers of various types can be included such as thrust washers, split washer, and the like. In other embodiments, the load cell sensors may be mounted by other fastening methods such as rivets, clamps, welding and the like. The length of the load cell sensor 202 between the first sensor end 212 and the second sensor end 214 can be approximately 73 millimeters. The load cell sensor 202 can include a symmetrical strain bar 220 which may be made of a metallic material that is substantially encased in a potting material 224 such as molded thermoplastic. The potting material 224 can be molded to form a substantially rectangular housing around the symmetrical strain bar 220 and can compactly and securely group the components of the load cell sensor 202 together. The symmetrical strain bar 220 and the potting material 224 can be provided as a sealed package for readily mounting to a surface of the walking beam 130 with the potting material providing protection to the internal components. The conductive cable 204 can be secured in and extend from the housing defined by the potting material 224.

Referring to FIGS. 5 and 6, the symmetrical strain bar 220 can be a barbell-shaped structure including a first mounting end 230 and an opposite second mounting end 232 that are joined by an intermediate connecting span 234 extending between the mounting ends. To accommodate the fasteners, the first and second mounting ends 230, 232 can each include a circular fastener aperture or fastener hole 236 disposed there through. The symmetrical strain bar 220 can have an elongated shape delineated by the first and second mounting ends 230, 232 that defines a longitudinal axis 240 between the first and second mounting ends 230, 232 that may correspond to the centerline of the barbell shape configuration. The longitudinal axis 240 can traverse a lateral axis 242 that extends from side to side of the symmetrical strain bar 220. To establish a low profile for the load cell sensor 202 so that it does not protrude significantly when mounted to the surface of the walking beam 130, the strain bar can have a reduced thickness described below in the vertical axis 244 that is oriented perpendicularly to both the longitudinal axis and the lateral axis. Accordingly, the height of the symmetrical strain bar 220 in the vertical axis 244 is substantially less than its length in the longitudinal axis 240 and width in the lateral axis 242.

The load cell sensor 202 operates by applying a load 248 or force between the first and second mounting ends 230, 232 that places the symmetrical strain bar 220 in either tension or compression. To orientate the external load 248 to place the strain bar in a maximum state of tension or compression, the external load 248 can be aligned with the longitudinal axis 240 so that the symmetrical strain bar 220 is stretched or compressed there along without bending about the lateral axis 242 or vertical axis 244. The external load 248 can be applied through the fasteners that are received through the circular fastener holes 236 disposed through the first and second mounting ends 230, 232. The symmetrical strain bar 220 may have a degree of elasticity so that the force of the applied load 248 elastically deforms the symmetrical strain bar 220, for example, by either stretching it or contracting it without plastic deformation. Thus, when the load 248 is removed, the symmetrical strain bar 220 can return to its original shape.

Figure 7:
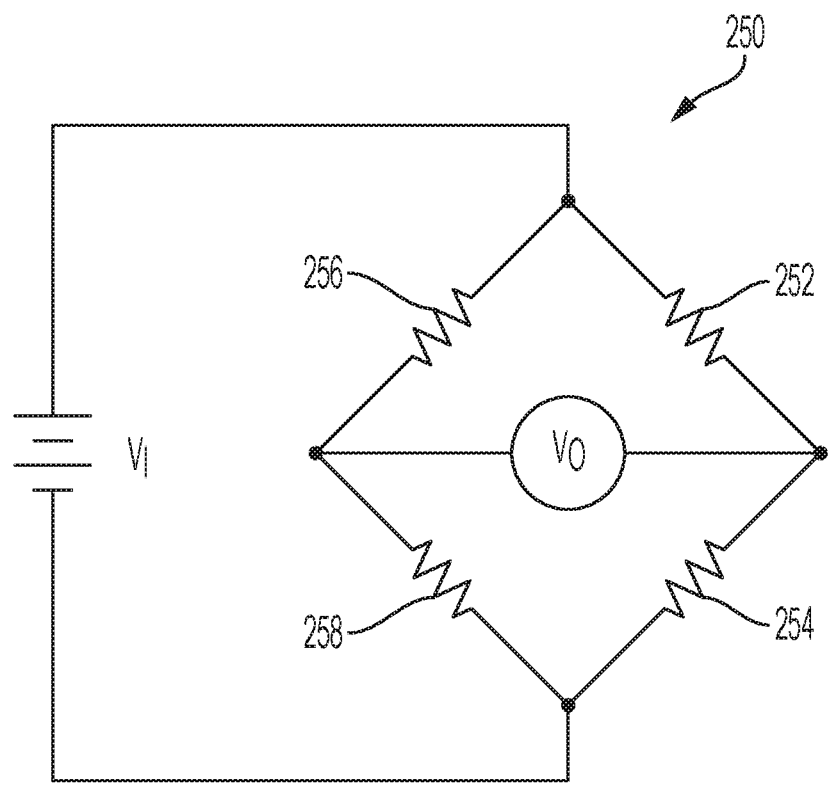
FIG. 7 is a schematic diagram of a strain gauge that may be attached to the strain bar and used to measure loads applied to the load cell sensor.

Referring additionally to FIG. 7, to measure the deformation of the symmetrical strain bar 220, in an embodiment, a strain gauge 250 can be attached to the connecting span 234. The strain gauge 250 is an electrical device made of a conductive material such as fine wires or foil whose electrical properties change when the strain gauge is physically deformed. Specifically, the electrical resistance of the strain gauge 250 may increase if dimensionally stretched and may decrease if the strain gauge is dimensionally compressed. As an electrical circuit, in an embodiment, the strain gauge 250 can be configured as a Wheatstone bridge and include four resistive legs. Specifically, the strain gauge 250 can include a first leg 252 and a second leg 254 connected in series that form one half of the divided circuit, and a third leg 256 and a fourth leg 258 also connected in series that form the other half of the circuit. The legs may be applied on a carrier, which may be layer of elastic material having adhesive backing for attaching the strain gauge 250 to a surface of the symmetrical strain bar 220. Some of the legs 252, 254, 256, 258 may be active elements or sensing elements, meaning they are physically distorted when a force is applied to the strain gauge 250, and the other legs can function as reference elements. Measuring the voltage output between the first and second legs 252, 254 and the third and fourth legs 256, 258 serves as a representation of the amount of physical distortion and can be converted to the amount of force applied to the symmetrical strain bar 220. The output voltage can be transmitted to the electronic controller described in FIG. 1 that is programmed to convert the electrical signal into force measurements and further estimate the payload of the machine.

Referring to FIGS. 5 and 6, the symmetrical strain bar 220 as implied can have a symmetrical shape in which the outline of the strain bar is the same when divided into equal halves along any of the longitudinal axis 240, the lateral axis 242, and the vertical axis 244. To enable the symmetrical strain bar 220 to elongate under load 248, the area, mass, and thus relative stiffness of connecting span 234 can be reduced compared to that of the first and second mounting ends 230, 232. In particular, the first and second mounting ends 230, 232 are generally flat and have the same rectangular cross-sectional dimension with respect to the longitudinal axis 240 and lateral axis 242 and the connecting span 234 has a relatively reduced rectangular cross-sectional dimension with respect to the longitudinal axis 240 and lateral axis 242. For example, the flat first and second mounting ends 230, 232 can each have an upper end surface aligned in an upper plane 260 and a lower end surface aligned in a lower plane 262 which are co-planer with each other. The distance between the upper plane 260 and the lower plane 262 can define an end thickness 264 in the vertical axis 244 of the symmetrical strain bar 220.

The connecting span 234, which is also generally planar and flat, can be disposed between the upper and lower planes 260, 262. In particular, the connecting span 234 can include an upper span surface 266 oriented parallel toward and spaced apart from the upper plane 260 and an opposite lower span surface 268 oriented parallel toward and spaced apart from the lower plane 262. The connecting span 234 therefore has a span thickness 269 in the vertical axis 244 as measured between the upper span surface 266 and the lower span surface 268 that is less than the end thickness 264. In an example, the end thickness 264 can be approximately 8.0 millimeters and the span thickness 269 can be approximately 0.5 millimeters. The reduced cross-sectional area enables the connecting span 234 to physically distort to a greater extent than the first and second mounting ends 230, 232, even if the material of the strain bar has the same elastic modulus throughout. The upper span surface 266 and the lower span surface 268 may be equivalently spaced apart from the upper and lower planes 260, 262 so that the connecting span 234 is situated intermediately between mounting ends 230, 232.

To complete the barbell shape, the first and second mounting ends 230, 232 may also each have a first side edge aligned in a first side plane 270 and a parallel second side edge aligned in a second side plane 272 that defines an end width 274 in the lateral axis 242. The connecting span 234 can also include a first span edge 276 and a second span edge 278 that are parallel to the first and second side planes 270, 272, which define a span width 279 in the lateral axis 242. However, the first and second span edges 276, 278 can be set inward between the first and second side planes 270, 272 by respective first and second recessed notches 280, 282. The first and second recessed notches 280, 282 therefore result in the span width 279 being reduced with respect to the end width 274 associated with the first and second mounting ends 230, 232. For example, the end width 274 may be approximately 25 millimeters and the span width 279 may be approximately 15 millimeters.

To direct the external load 248 applied to the first and second mounting ends 230, 232 to the narrower connecting span 234, the mounting ends and connecting span can be joined at a plurality of fillets. For example, a series of upper fillets 290 can be formed at and connect the upper span surface 266 to the first and second mounting ends 230, 232 and extend to upper plane 260 aligned with the upper end surface of the first and second mounting ends. Similarly, a series of lower fillets 292 can be formed at and connect to the first and second mounting ends 230, 232 and can extend from the lower span surface 268 to the lower plane 262 aligned with the lower end surfaces of the mounting ends. Further, a plurality of edge fillets 294 can join the first and second span edges 276, 278 of the connecting span 234 to the first and second mounting ends 230, 232 and extend respectively to the first side plane 270 and second side plane 272. Connecting the first and second mounting ends 230, 232 to the intermediate connecting span 234 with fillets 290, 292, 294 reduces the stress concentrations that may otherwise result if the mounting ends and the connecting span were joined by sharp corners.

Referring to FIG. 4, to further strengthen mounting of the load cell sensor 202 to the walking beam 130, an adhesive can be applied between the load cell sensor and the surface of the walking beam including where the fasteners 210 are joined to the walking beam. An example of a suitable adhesive is Loctite® 330 acrylic, which is a high strength compound. Placement of the adhesive between the walking beam 130 and the load cell sensor 202 can advantageously resist any slippage, creep, or movement of the load cell sensor 202 after it has been mounted. It will be appreciated that after the load cell sensor 202 has been mounted to the walking beam 130, any subsequent movement between the two components can register as a force applied to the symmetrical strain bar 220 and can result in inaccurate readings. Application of the adhesive improves the strength of the bolted joint formed by the fasteners 210 and threaded inserts 216 to resist shear stresses that may be imparted to the load cell sensor 202 to avoid slippage, creep, or movement. Further, because elastic distortion and/or extension occurs primarily in the region of the connecting span 234 which functions as a spring, and which may be characterized as having a spring constant governing the amount of distortion and/or extension of the connecting span such that the first and second mounting ends 230, 232 can respectively move apart and together, which further reduces shear stresses imparted to the mounting bolts. The spring constant associated with the connecting span 234 thus further reduces slippage, creep or movement.

INDUSTRIAL APPLICABILITY

Figure 8:
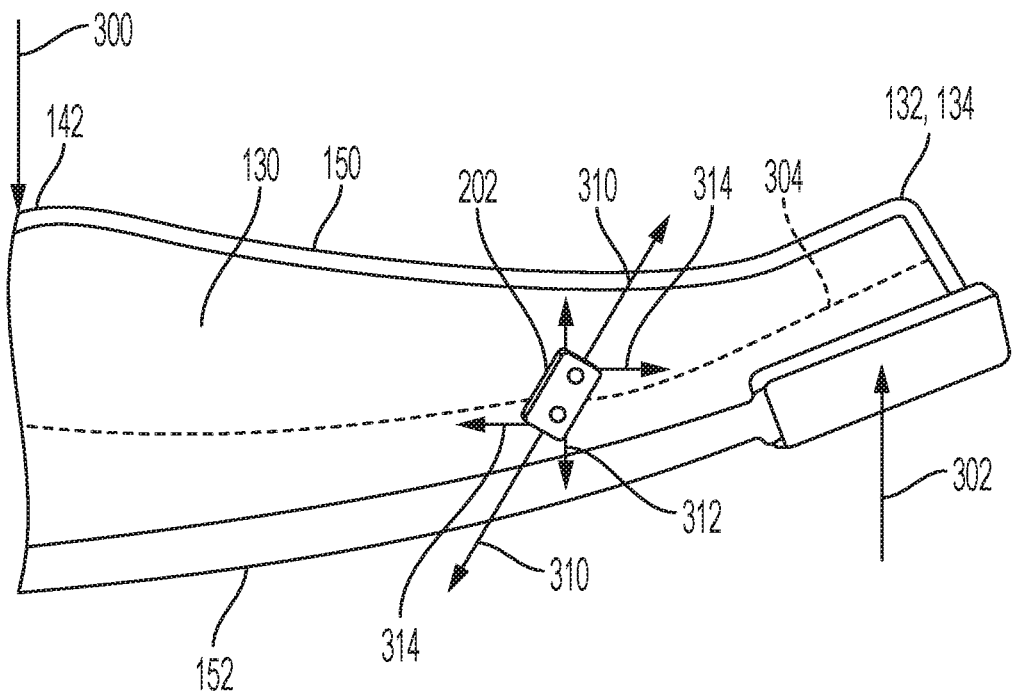
FIG. 8 is a schematic representation of the walking beam with a load cell sensor mounted thereon undergoing bending and displacement due to applied forces and loads that may be imparted to the machine.

Referring to FIG. 8, there is illustrated the displacement of the walking beam 130 as forces applied due to a material payload being added to the hauling body that maybe subsequently measured by the load cell sensor 202. The displacement of the walking beam may be exaggerated for illustrative purposes from that shown in FIG. 8 and therefore actual displacements may differ from that shown.

The material payload is added to the hauling body and exerts a downward force on the walking beam 130 proximate where it is joined to the center joint 142, as indicated by arrow 300, which is countered by an upward reactionary force as indicated by arrow 302 at the first and second beam ends 132, 134 which connect to the axles. The forces 300, 302 cause the walking beam 130 to curve upward as the walking beam extends from the center joint 142 to the first or second beam ends 132, 134. Curving of the walking beam 130 due to the imparted forces places the upper surface 150 in compression and places the lower surface 152 in tension. A neutral axis 304 extending laterally from the center joint 142 and the first and/or second beam end 132, 134 and that is located between the upper surface 150 and the lower surface 152 is in either compression or tension and demarcates the transition between the two states.

To obtain a reading of the applied loads or forces, the load cell sensor 202 can be mounted to the walking beam to extend across the neutral axis 304. Accordingly, any loads tending to bend the walking beam 130 will place the load cell sensor 202 in tension or strain, as indicated by the opposing arrows 310. Further, each of the load cell sensors 202 can be disposed at an angular orientation to the neutral axis 304, for example, by 45° when the walking beam 130 is not under load. When the walking beam 130 is loaded, however, the bending of the neutral axis 304 will apply vertical load components 312 and horizontal load components 314 to the load cell sensor 202. Because of the angular orientation, the vertical and horizontal load components 312, 314 will combine in the resultant tension 310, which places the load cell sensor 202 in tension. Having the load cell sensor 202 traverse the neutral axis 304 at an angle can result in maximum tension forces imparted to the walking beam 130 being applied to the load cell sensor. Placing the load cell sensor 202 primarily under tension loads as indicated by opposing arrows 310 will elastically deform the symmetrical strain bar 220 and change the resistance of the strain gauge 250, which can be converted to a measurement of the applied loads.

Referring to FIGS. 5 and 6, the resulting tension loads 248 are linearly aligned with and directed along the longitudinal axis 240 of the symmetrical strain bar 220. Because of the symmetrical shape, the linearly applied tension loads 248 are furthermore directed through the centrally located connecting span 234. For example, the applied tension loads 248 pulling the first and second mounting ends 230, 232 in opposite directions are centrally directed to the longitudinal axis 240 and concentrate evenly on the connecting span 234. The external load 248 is therefore directed linearly through the material of the connecting span 234. Accordingly, the dimensional elongation occurring on the upper span surface 266 is approximately the same as the elongation occurring on the lower span surface 268 and both surfaces stretch or elongate to equal extents. Further, predominately all distortion of the symmetrical strain bar 220 occurs in one axial direction, aligned with the longitudinal axis 240, such that the strain gauge 250 mounted on the connecting span 234 obtains direct readings of the applied load. Further, because the upper and lower span surfaces 266, 268 elongate to equal extents, the strain gauge 250 will obtain the same strain measurements whether it is mounted to either the upper span surface 266 or lower span surface 268.

Figure 9:
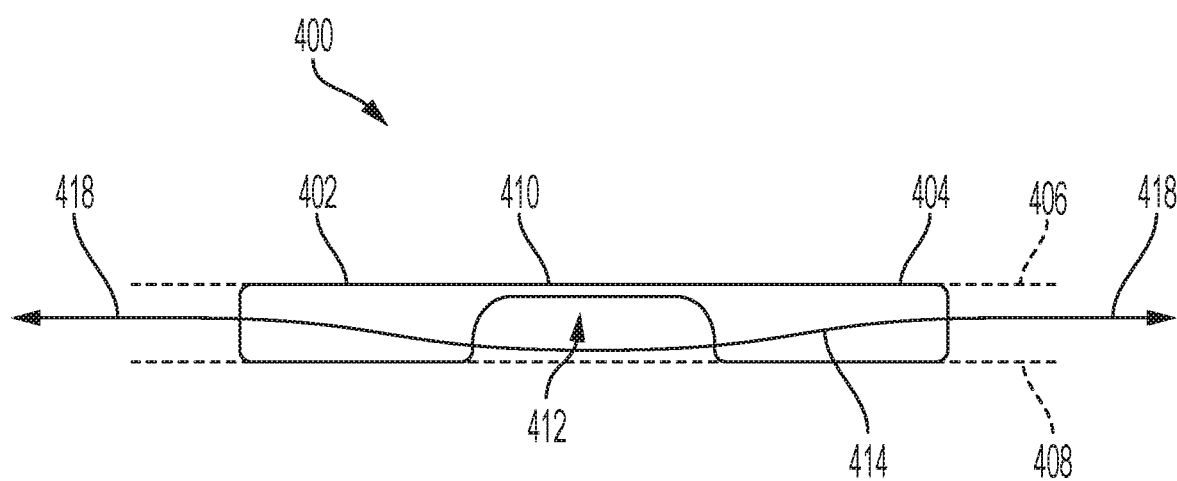
FIG. 9 is a side elevational view of an asymmetrical strain bar schematically illustrating a strain load being applied thereto.

The advantage of a symmetrical strain bar can be contrasted with the application of forces to an asymmetrical strain bar 400 as illustrated in FIG. 9. In an asymmetrical strain bar 400, the thicker flat first and second mounting ends 402, 404 align with an upper plane 406 and a parallel lower plane 408. The connecting span 410 connecting the first and second mounting ends 402, 404 is aligned with one of the upper and lower plane 406, 408 as illustrated. In other words, the upper and/or lower end surfaces of the mounting ends 402, 404 and the upper and/or lower span surfaces of the connecting span 410 align together in one of the upper or lower planes 406, 408. The offsetting of the connecting span 410 to either the upper or lower plane 406, 408 results in an arch-shape to the asymmetrical strain bar 400 and creates a void 412 proximate the opposite plane. The longitudinal axis 414, which is located midway between the upper plane 406 and the lower plane 408, must traverse the void. Therefore, when tension loads 418 are applied to the first and second mounting ends 402, 404, the loads do not pass directly through the connecting span 410 as would occur in a symmetrical strain bar. The uneven application of loads 418 may result in bending and distortion of the asymmetrical strain bar 400 with respect to the longitudinal axis 414 as indicated by arrow 420, which may result in inaccurate readings from the strain gauge attached to the connecting span 410.

Figure 10:
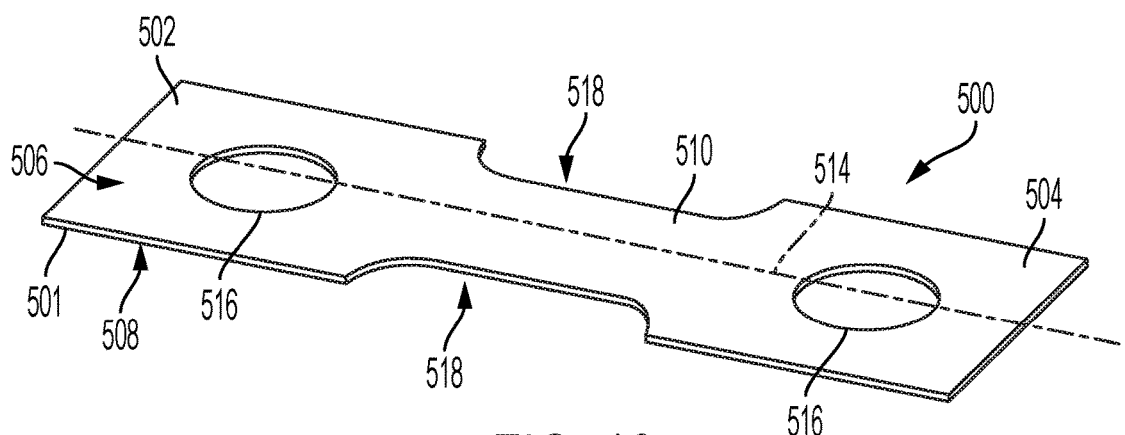
FIG. 10 is a perspective view of an embodiment of a symmetrical strain bar made from a thin plate and having a connecting span of reduced dimension extending between first and second mounting ends.

Referring to FIG. 10, there is illustrated an embodiment of a symmetrical strain bar 500 in accordance with the disclosure made from a thin plate 501 of material having first and second mounting ends 502, 504 connected by a connecting span 510 of reduced dimension. The thin plate 501 can be made from any suitable material including metals such as spring steels or the like and can be generally disposed in a flat two-dimensional plane, having an upper surface 506 and a lower surface 508. The first and second mounting ends 502, 504 and the connecting span 510 are aligned along a longitudinal axis 514 extending parallel with the upper and lower surfaces 506, 508. The first and second mounting ends 502, 504 can be generally square in shape and can each include a circular fastener hole 516 disposed therein between the upper and lower surface 506, 508 to receive a threaded fastener for mounting to the walking beam. Due to the flat, planar shape of the symmetrical strain bar 500, the connecting span 510 is coextensively bound between the upper and lower surface 506, 508. To enable the connecting span 510 to distort and extend when under a load applied proximate the circular fastener holes 516, the width of the connecting span is reduced compared to the first and second mounting ends 502, 504 and thus the symmetrical strain bar 500 includes first and second recessed notches 518 disposed inwardly toward the longitudinal axis 514. The reduction in material due to the first and second recessed notches enables the connecting span 510 to demonstrate a spring-like characteristic with respect to the first and second mounting ends 502, 504.

Figure 11:
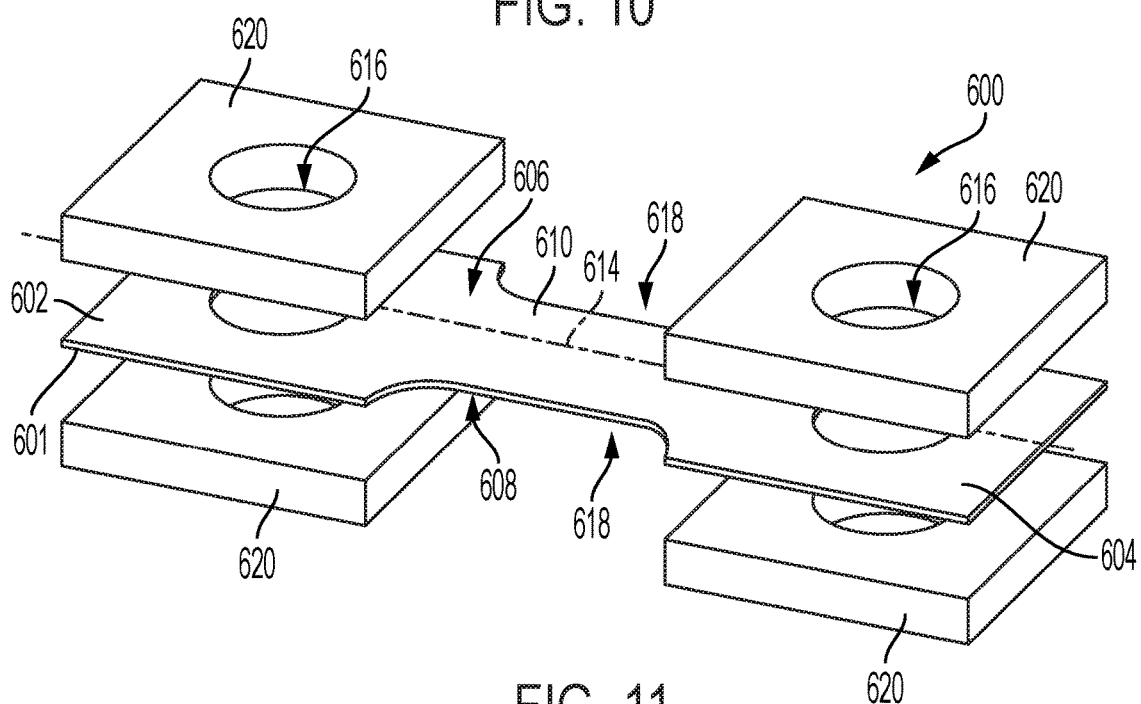
FIG. 11 is an assembly view of an embodiment of a symmetrical strain bar made from a thin plate with upper and lower mounting blocks for forming the mounting ends.
Figure 12:
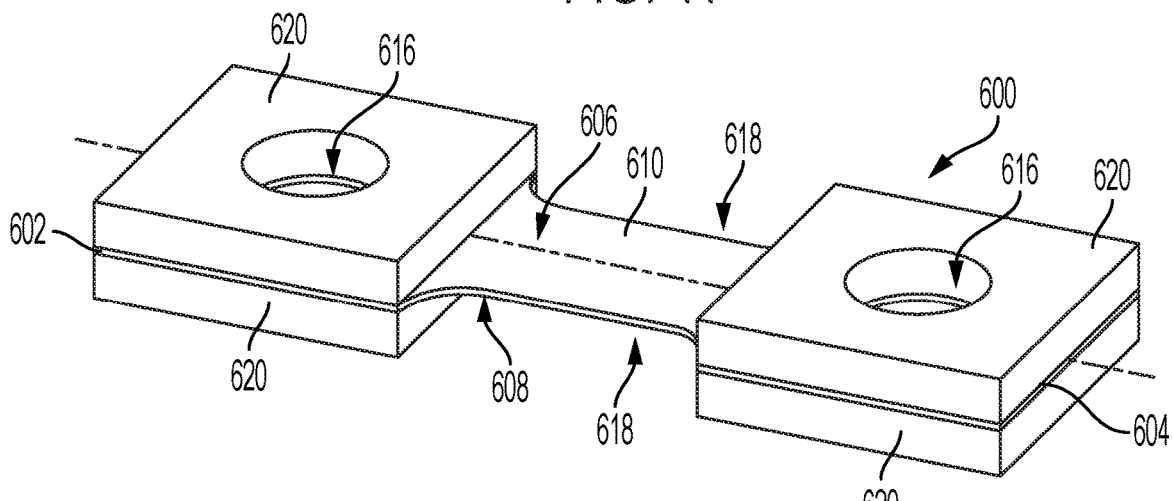
FIG. 12 is a perspective view of the symmetrical strain bar of FIG. 11 as assembled illustrating the mounting blocks attached to the thin plate thereby forming the mounting ends.

Referring to FIGS. 11 and 12, there is illustrated a further embodiment of the symmetrical strain bar 600 in accordance with the disclosure made with a thin planar plate 601 and including a plurality of mounting blocks 620 attached to the first and second mounting ends 602, 604 to provide a three-dimensional shape. The thin planar plate 601 also includes a connecting span 610 extending between the first and second mounting ends 602, 604 which are all coextensively bound within the plane defined between the upper and lower surfaces 606, 608 that extend parallel to the longitudinal axis 614. To enable distortion or extension under load, the connecting span 610 can include inwardly disposed recessed notches 618 to reduce the relative width of the thin planar plate 601. The mounting blocks 620 however may be thicker than the thin planar plate 601 and can be generally square, corresponding in shape to the first and second mounting ends 602, 604.

A total of four mounting blocks 620 can be attached to the upper and lower surfaces 606, 608, respectively, of the first and second mounting ends 602, 604. The plurality of mounting blocks 620 can be made from any suitable material including a metallic material such as spring steel and can be attached to the thin planar plate 601 by any suitable attachment method such as brazing or adhesive or, in an embodiment, may remain loose. To receive threaded fasteners for mounting to the walking beam, the mounting ends 602, 604 and the mounting blocks 620 can include circular fastener holes 616 that align when assembled. The mounting blocks 620 thus provide rigid structural enlargements for the fasteners to compress against while the reduced dimension and material of the connecting span 610 imparts a spring-like characteristic that enables the symmetrical strain bar 600 to distort and/or extend and recover with respect to the longitudinal axis 614.

Figure 13:
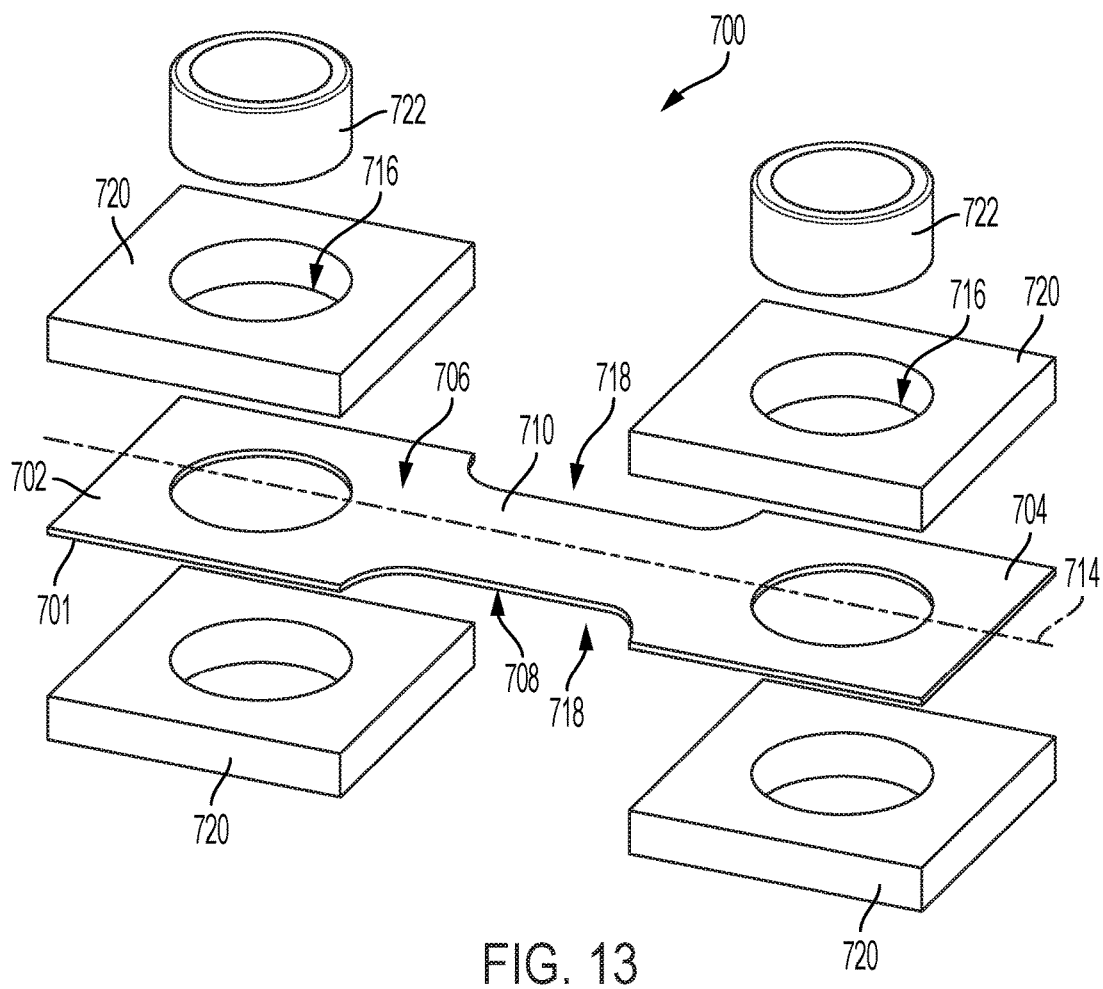
FIG. 13 is an assembly view of an embodiment of the symmetrical strain bar made from a thin plate with upper and lower mounting blocks for forming the mounting ends with bushings inserted therein.
Figure 14:
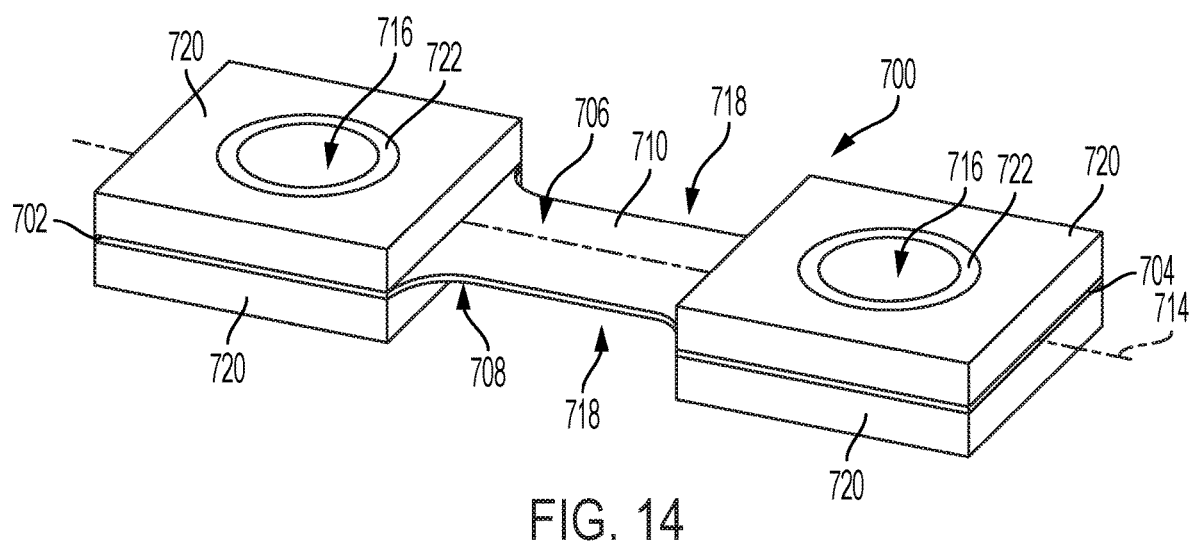
FIG. 14 is a perspective view of the symmetrical strain bar of FIG. 13 illustrating the upper and lower mounting blocks attached to the thin plate with the bushing inserted therein.

Referring to FIGS. 13 and 14, there is illustrated a further embodiment of the symmetrical strain bar 700 in accordance with the disclosure made with a thin planar plate 701 having a plurality of mounting blocks 720 attached to the first and second mounting ends 702, 704. The thin planar plate 701 can also include a connecting span 710 aligned with the longitudinal axis 714 extending between and planar with the first and second mounting ends 702, 704 coextensively bound between the upper and lower surfaces 706, 708 with the mounting blocks 720 providing three-dimensional shape and rigidity. The reduced dimensional area and material provided by the recessed notches 718 disposed inwardly into the thin planar plate 701 enables the connecting span 710 to distort and spring back to enable extension and contraction of the symmetrical strain bar 700. To facilitate accommodating the fasteners, the symmetrical strain bar 700 can include a plurality of bushings 722 that are inserted into and align with the circular fastener holes 716 of the first and second mounting ends 702, 704 and the plurality of mounting blocks 720 attached thereto. The bushings 722 can be made of a similar or different material as the other components. The bushings 722 can be shaped as tubular cylinders and can be press-fit into the circular fastener holes 716 or the components of the symmetrical strain bar 700 can be securely assembled by adhesive or brazing. In another embodiment, the bushings 722 can have a tapered or conical shape and the circular fastener holes 716 can have corresponding tapers to assist in insertion and lock the components of the symmetrical strain bar 700 together. In a further embodiment, individual dowel pins can be inserted into corresponding dowel holes disposed through the first and second mounting ends 702, 704 of the thin planar plate 701 and through the plurality of mounting blocks 720 to securely assemble the components of the symmetrical strain bar 700.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A payload measurement system comprising:
   a walking beam associated with a machine having a hauling body, the walking beam including a first beam end operatively connected to a first axle, a second beam end operatively connected to a second axle, and a center joint pivotally connected to a frame of the machine;
   a plurality of load cell sensors mounted to the walking beam, the plurality of load cell sensors including a first load cell sensor located at the first beam end and a second load cell sensor located at the second beam end, the first load cell sensor and the second load cell sensor each including a symmetrical strain bar having a first mounting end and a second mounting end of an end thickness and having a connecting span extending between the first and second mounting ends, the connecting span having an upper span surface and a lower span surface being parallel to each other;
   an end thickness of the first mounting end and the second mounting end being greater than a span thickness of the connecting span;
   the first mounting end and the second mounting end having upper surfaces aligned in an upper plane and lower surfaces aligned in a lower plane with the connecting span being equally spaced between the upper plane and the lower plane;
   a strain gauge mounted to one of the upper span surface and the lower span surface of the connecting span; and a potting material encasing the symmetrical strain bar and the strain gauge so as to form a rectangular housing of the load cell sensor;

wherein each load cell sensor is located so that the connecting span spans a neutral axis of the walking beam located between an upper surface and a lower surface of the walking beam, the neutral axis extending between the first beam end and the second beam end; and an electronic controller in electronic communication with the first load cell sensor and the second load cell sensor, the electronic controller being configured to determine a material payload in the hauling body.

2. The payload measurement system of claim 1, wherein the first and second mounting ends of the symmetrical strain bar each include an upper end surface aligned in an upper plane and a lower end surface aligned in a lower plane, and the connecting span is disposed between and evenly spaced apart from the upper plane and the lower plane.

3. The payload measurement system of claim 2, wherein the end thickness of the first and second mounting ends is approximately 8.0 millimeters and the span thickness of the connecting span is 0.5 millimeters.

4. The payload measurement system of claim 3, wherein the first and second mounting ends of the symmetrical strain bar each include a first side edge aligned in a first side plane and a second side edge aligned in a second side plane, and the connecting span is set inward from the first side plane by a first recessed notch and from the second side plane by a second recessed notch.

5. The payload measurement system of claim 1, wherein the first mounting end and the second mounting end of the symmetrical strain bar each defines a fastener hole disposed between the upper end surface and the lower end surface.

6. The payload measurement system of claim 5, wherein the plurality of load cell sensors are mounted to the walking beam with a threaded fastener disposed through each fastener hole disposed through the first and second mounting ends disposed through the symmetrical strain bar.

7. The payload measurement system of claim 6, wherein the threaded fastener engages a threaded insert welded to the walking beam.

8. The payload measurement system of claim 7, wherein the threaded insert spaces the load cell sensor from a surface of the walking beam.

9. The payload measurement system of claim 1, wherein the plurality of load cell sensors is mounted with an adhesive disposed between each load cell sensor of the plurality of load cell sensors and a surface of the walking beam.

10. The payload measurement system of claim 1, wherein each load cell sensor is angularly oriented with respect to the neutral axis of the walking beam.

11. A load cell sensor for a payload measurement system, the load cell sensor comprising:

a symmetrical strain bar including
a first mounting end and a second mounting end each including an upper end surface aligned in an upper plane and a lower end surface aligned in a lower plane, the upper plane and the lower plane defining an end thickness there between, and
a connecting span between the first and second mounting ends and equally spaced from the upper plane and the lower plane,
the first mounting end and the second mounting end each having an end thickness greater than a span thickness of the connecting span;
a strain gauge mounted to one of an upper span surface and a lower span surface of the connecting span; and
a potting material encasing the symmetrical strain bar and the strain gauge so as to form a rectangular housing of the load cell sensor.

12. The load cell sensor of claim 11, wherein the first and second mounting ends of the symmetrical strain bar each include an upper end surface aligned in an upper plane and a lower end surface aligned in a lower plane, and the connecting span is disposed between and evenly spaced apart from the upper plane and the lower plane.

13. The load cell sensor of claim 12, wherein the end thickness of the first and second mounting ends is approximately 8.0 millimeters and the span thickness of the connecting span is 0.5 millimeters.

14. The load cell sensor of claim 13, wherein the first mounting end and the second mounting end are spaced apart along a longitudinal axis and the connecting span is aligned on the longitudinal axis such that an external linear load applied to the longitudinal axis is linearly directed through the connecting span.

15. The load cell sensor of claim 11, wherein the first mounting end and the second mounting end of the symmetrical strain bar each define a fastener hole disposed between the upper end surface and the lower end surface.

16. The load cell sensor of claim 11, wherein the first mounting end and the second mounting end of the symmetrical strain bar each defines a fastener hole disposed between the upper end surface and the lower end surface.

17. The load cell sensor of claim 11, wherein the strain gauge is configured as Wheatstone bridge.

* * * * *